United States Patent Office 3,557,132
Patented Jan. 19, 1971

3,557,132
POLYAMIDE MOULDING COMPOSITIONS
Karl-Heinz Hermann and Hans Rudolph, Krefeld-Bockum, Heinz Gilch, Krefeld, and August Bockmann, Krefeld-Bockum, Germany, assignors to Farbenfabriken Bayer Aktiengesellschaft, Leverkusen, Germany, a corporation of Germany
No Drawing. Filed July 21, 1967, Ser. No. 654,957
Claims priority, application Germany, Sept. 8, 1966,
F 50,151
Int. Cl. C08c 11/44
U.S. Cl. 260—302                                    4 Claims

ABSTRACT OF THE DISCLOSURE

Polyamide moulding compositions containing as a mould removal agent 0.01 to 10% by weight of an N-substituted cyclic imide.

The present invention relates to polyamides which contain an imido compound as additive to facilitate their removal from moulds in which they have been shaped in the molten state.

It is already known to add natural or synthetic waxes, fatty alcohols or their hydroxyalkylation products, fatty acids or their alkali metal or alkaline earth salts, fatty acid nitriles, fatty acid amides or fatty amines to polyamides as mould parting agents.

These mould parting agents, are usually added to the polyamide itself, being either homogeneously mixed with the granular or pulverulent polyamide before it is shaped or homogeneously distributed in the molten polyamide by means of a suitable mixing device such as stirrers, kneaders, extruders, etc. Addition of the mould parting agents to the polyamide-forming monomers before polymerisation is not possible in the case of most mould parting agents, e.g. natural or synthetic waxes, fatty amines, fatty acids, their salts or esters, and fatty acid nitriles, since they either decompose at the temperatures necessary for polymerisation or react with the carboxyl or amino end groups of the polyamides and thus lose their activity.

Some of the mould parting agents hitherto described are not sufficiently effective, e.g. the fatty alcohols, their hydrooxyalkylation products and fatty acid amides. Others promote degradation of the polyamides or prolonged heating to temperatures above the melting point, e.g. fatty acids and their salts.

It has now been found that the removal of shaped polyamides from moulds in which they have been moulded in the molten state is facilitated by adding monomeric N-substituted cyclic imides as mould parting agents to the polyamides before, during or after their production. It is particularly preferred that monomeric N-substituted cyclic imides be added to the polyamide forming monomers before polymerisation.

The invention thus relates to polyamide moulding compositions which contain, as mould parting agents, N-substituted cyclic imides in quantities of from 0.01 to 10% by weight, and if desired also the usual polyamide additives.

The polyamides acording to the present invention are solid polymers in which the monomers are linked together via amide bonds, for example polycondensates of diamines and dicarboxylic acids, e.g. hexamethylene diamine, decamethylene diamine, ethylene diamine, trimethyl-hexamethylene diamine, 1,4 - bis-aminomethylcyclohexane, m-xylylene diamine, or 4,4'-diaminodicyclohexylmethane with adipic acid, decanedicarboxylic acid, oxalic acid, 1,4-cyclohexane dicarboxylic acid, terephthalic acid or isophthalic acid, or polycondensates or polymers of aminocarboxylic acids or their lactams, e.g. aminocaproic acid, amino decanoic acid, caprolactam or laurin lactam, or polycondensates or polymers of several of the above mentioned components.

N-substituted cyclic imides in accordance with the present invention are preferably monomeric compounds of the formula:

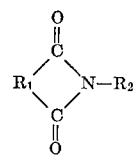

wherein $R_1$ denotes a difunctional aliphatic, cycloaliphatic, aromatic, aliphatic-aromatic or aromatic-aliphatic hydrocarbon radical or the radical

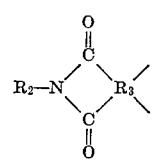

and $R_2$ denotes a monofunctional aliphatic, cycloaliphatic aromatic, aliphatic-aromatic or aromatic-aliphatic hydrocarbon radical or the radical

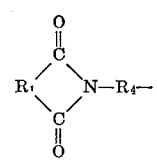

and $R_3$ denotes a tetrafunctional aliphatic, cycloaliphatic, aromatic aliphatic-aromatic or or aromatic-aliphatic hydrocarbon radical, and $R_4$ denotes a difunctional aliphatic, cycloaliphatic, aromatic, aliphatic-aromatic or aromatic-aliphatic hydrocarbon radical. $R_1$ is, for exmple, a difunctional alkylene radical, (preferably with 2 to 24 C atoms), phenylene radical, difunctional cycloalkenyl ($C_5$–$C_7$) or divalent cycloalkyl ($C_4$–$C_7$) radical which may be substituted preferably with alkyl ($C_1$–$C_{20}$). The following are examples of such radicals:

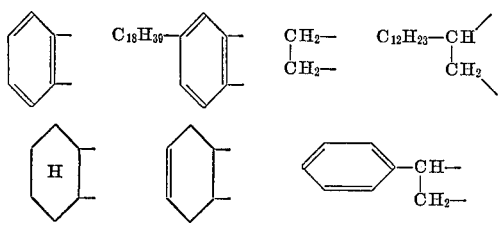

The radical $R_2$ may, for example, be an alkyl radical (preferably $C_{12}$ to $C_{24}$), a cycloalkyl radical (preferably $C_5$–$C_7$) which may also be further substituted by alkyl (preferably $C_1$–$C_{24}$), an optionally alkyl (preferably $C_1$–$C_{24}$) substituted phenyl radical or a phenyl substituted alkyl (preferably $C_6$–$C_{24}$) radical. The following are examples of such radicals:

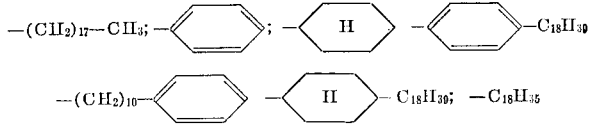

$R_3$ is preferably a tetrafunctional alkyl radical (preferably $C_5$–$C_{26}$), cycloalkyl radical (preferably $C_4$–$C_7$), phenyl radical or binuclear aromatic hydrocarbon radical. The following are examples of $R_3$:

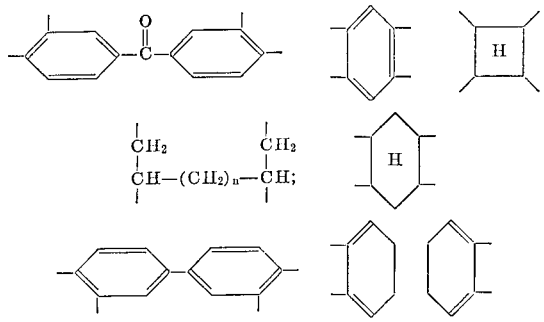

($n$=1–22.)

$R_4$ is preferably a difunctional alkyl radical (preferably $C_{10}$–$C_{24}$) or a binuclear aromatic hydrocarbon radical. The following are examples of $R_4$:

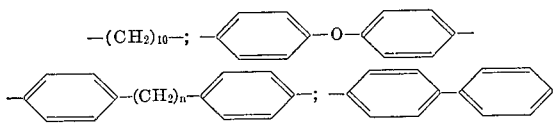

($n$=1–22.)

The N-substituted cyclicimides used preferably contain at least one aliphatic radical with 12 or more carbon atoms in the chain.

The following are examples of the compounds to be used in the present invention

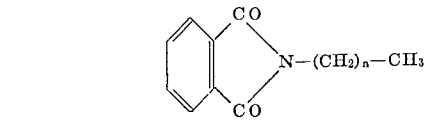

($n$=12–22.)

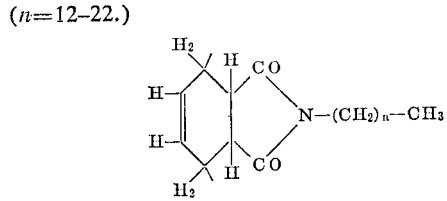

($n$=12–22.)

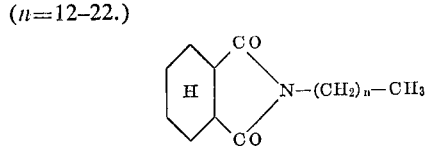

($n$=12–22.)

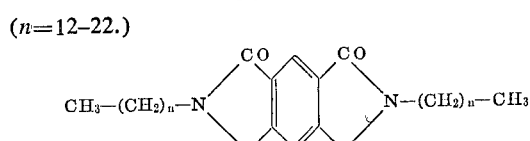

($n$=12–22.)

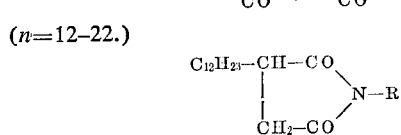

(R=alkyl, cycloalkyl-, aralkyl or aryl radical.)

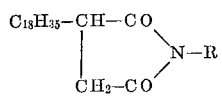

(R=alkyl-, cycloalkyl-, aralkyl- or aryl radical.)

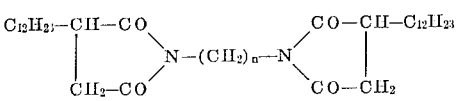

($n$=2–10.)

For these compounds to be most effective, the acid radical should not be aromatic.

The imide-containing mould parting agents are added to the polyamides in quantities of 0.01 to 10 and preferably 0.1 to 2% by weight. Owing to the excellent thermal stability and compatibility of the parting agents with polyamides, they may be added to the polyamide forming starting materials, whereupon polymerisation is carried out in known manner intermittently, e.g. in autoclave, or continuously, e.g. in tube reactors, if desired with water or compounds which liberate water as catalyst or under anhydrous conditions using alkaline catalysts, preferably in the presence of N-alkyl substituted carboxylic acid amides, e.g. caproic acid stearylamide or palmitic acid dodecylamide as chain stabilisers.

Alternatively, the mould parting agents may be distributed homogeneously, if desired in the form of concentrates in the polyamides during or after polymerisation, by means of suitable mixing apparatuses such as stirrers, kneaders or extruders.

In addition to the mould parting agents, the polyamides may contain the usual additives such as pigments, dyes, heat and light stabilisers, optical brightening agents, fillers such as glass fibres or asbestos fibres, plasticisers, agents which promote crystallisation and chain breaking agents. Polyamides which contain the mould parting agents according to the present invention are eminently suitable for the production of articles of complicated shape which are difficult to remove from moulds, such as combs, housings, cylindrical parts with narrow bores, bearing bushes and gear wheels. One advantage of the polyamides produced according to the invention is that moulding temperatures of 120° C. and more can be used without difficulties arising in removing pointed tips from moulds. Owing to the high moulding temperature, the tips are obtained in crystalline form in which the tensile strength, compression strength, elastic modulus, hardness and abrasion resistance are greater than in comparable parts that are produced at lower moulding temperatures for the purpose of avoiding difficulties in removal from the mould.

EXAMPLE 1

10 kg. portions of caprolactam are polymerised in an autoclave in the usual manner at 270° C. with the addition of 300 g. of aminocaproic acid as catalyst, 40 g. of caproic acid stearylamide as chain breaking agent, 1 g. of finely ground talcum as crystallisation promoter and 50 g. (0.5%) of different mould parting agents. The finished polyamide melt is then spun in water to form a filament of about 3 mm. diameter and chopped up into granules which are freed from monomeric constituents by boiling with water, and dried.

The products obtained are worked up in a conventional plunger moulding press (e.g. of the type EH 80 of Eckert & Ziegler) under the following conditions:

Moulding temperature (temperature of composition)— 260° C.
Temperature of nozzle—250° C.
Moulding pressure—800 kp./cm.$^2$
After pressure—800 kp./cm.$^2$
Temperature of mould—120° C.
Cycle—25 secs.
Including cooling time—7.5 secs.

(For some of the products, the cooling time and hence the cycle must be prolonged.)

The moulding is a circular plate of 80 mm. diameter and 1 mm. wall thickness with 6 radical reinforcement ribs 2 x 2 mm. in cross section. In addition, 6 reinforcement ribs of the same cross-section in the form of circular arcs extend from a distance of 5 mm. from the outer edge of the plate. The moulding is started with a central gate and is removed from the apparatus with 7 symmetrically arranged ejector pins.

The force required to remove the moulding, which is a measure of the ease of removal from the mould, is determined as follows:

A spring arranged centrally in the apparatus presses uniformly against the ejection pins. The spring excursion required for ejection is indicated by trailing pointer on a scale. The spring is so designed that its spring characteristic is straight line. The force is in the region of 0 to 30 kg.

The mould parting forces measured with different mould parting agents, and the increase in cooling time which may be required are summarised in Table I.

Experiments Nos. 7–13 are comparison tests with known mould parting agents and without mould parting agent.

We claim:
1. A polyamide moulding composition comprising a solid polyamide and from 0.01 to 10% by weight of an N-substituted cyclic imide of the formula

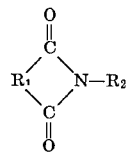

wherein $R_1$ is a difunctional aliphatic, cycloaliphatic, aromatic, aliphatic-aromatic or aromatic-aliphatic hydrocarbon radical or the radical

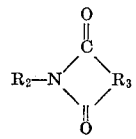

$R_2$ is a monofunctional aliphatic, cycloaliphatic, aromatic,

TABLE I

| Serial No. | Mould parting agent | Relative[1] viscosity | Force for removal from the mould in kp. | Increase in cooling time, sec. |
|---|---|---|---|---|
| 1 | N-octadecyl-isododecenyl succinic acid imide | 3.08 | 4.0 | 0 |
| 2 | N-octadecyl-isooctadecenyl succinic acid imide | 3.03 | 7.0 | 0 |
| 3 | N-octadecyl-hexahydrophthalic acid imide | 3.06 | 8.0 | 0 |
| 4 | N-octadecyl-tetrahydrophthalic acid imide | 3.03 | 10.0 | 0 |
| 5 | N,N'-ethylene-bis-isododecenyl succinic acid imide | 3.04 | 9.5 | 0 |
| 6 | N,N'-hexamethylene-bis-isooctadecenyl succinic acid imide | 3.06 | 7.5 | 0 |
| 7 | Behenic acid | 2.95 | 11.0 | 7.5 |
| 8 | Ca-stearate | 2.99 | 10.0 | 7.5 |
| 9 | Stearylamine | 2.97 | 10.0 | 7.5 |
| 10 | Stearic acid nitrile | 3.05 | 10.5 | 2.5 |
| 11 | Synthetic ester wax of nomtanic acids (acid number 17, esterification number 145). | 3.00 | 10.0 | 7.5 |
| 12 | Stearyl alcohol | 3.06 | 11.0 | 7.5 |
| 13 | | 3.09 | 12.0 | 7.5 |

[1] Measured in 1% solution in m-cresol at 25° C.

EXAMPLE 2

10 kg. portions of polycaprolactam having a relative viscosity of 3.12 (measured in 1% solution in m-cresol at 25° C.) in the form of granules are homegeneously mixed by tumbling with 1 g. of finely ground talcum and 50 g. (0.5%) of different mould parting agents, and then homogenised with a conventional extruder. The polyamide is extruded as a filament of about 3 mm. diameter, chopped up into granules, and dried.

The products obtained are worked up in the manner described in Example 1. The mould parting forces required with the use of the different mould parting agents and the required increase in cooling time, if any, are summarised in Table II.

Experiments Nos. 5–9 are comparison tests with known mould parting agents.

aliphatic-aromatic or aromatic-aliphatic hydrocarbon radical or the radical

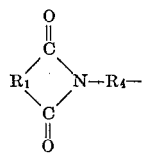

$R_3$ is a tetrafunctional aliphatic, cycloaliphatic, aromatic aliphatic-aromatic or aromatic-aliphatic hydrocarbon radical and $R_4$ is a difunctional aliphatic, cycloaliphatic, aromatic, aliphatic-aromatic or aromatic-aliphatic hydrocarbon radical.

TABLE II

| Serial No. | Mould parting agent | Mould parting force, kp. | Increase in cooling time, sec. |
|---|---|---|---|
| 1 | N-octadecyl-isododecenyl succinic acid imide | 7.0 | 0 |
| 2 | N-octadecyl-isooctadecenylsuccinic acid imide | 5.5 | 0 |
| 3 | N-octadecyl-hexahydrophthalimide | 7.0 | 0 |
| 4 | N,N'-ethylene-bis-isododecenyl succinic acid imide | 9.0 | 0 |
| 5 | Synthetic ester wax of montanic acids (acid number 17, esterification number 145). | 10.0 | 0 |
| 6 | Stearyl alcohol | 10.5 | 2.5 |
| 7 | Stearylamine | 9.0 | 0 |
| 8 | Behenic acid | 10.0 | 0 |
| 9 | Stearic acid nitrile | 9.5 | 0 |

2. The polyamide moulding composition of claim 1 wherein $R_1$ is a difunctional aliphatic or cycloaliphatic hydrocarbon radical or the radical

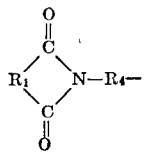

and $R_4$ is a difunctional aliphatic hydrocarbon radical.

3. The polyamide moulding composition of claim 1 wherein said N-substituted cyclic imide is N-octadecyl-isododecenyl succinic acid imide.

4. The polyamide moulding composition of claim 1 wherein the N-substituted cyclic imide is N-octadecyl-isooctadecenyl succinic acid imide.

References Cited
UNITED STATES PATENTS 3,309,365   3/1967   Merijan et al. ____ 260—326.5X

FOREIGN PATENTS 1,003,083   9/1965   Great Britain.

MORRIS LIEBMAN, Primary Examiner

R. D. ZAITLEN, Assistant Examiner

U.S. Cl. X.R.

260—32.4, 326.5